Nov. 28, 1939.  J. E. RENHOLDT  2,181,643
RECORD RESURFACING MACHINE
Filed Nov. 6, 1937
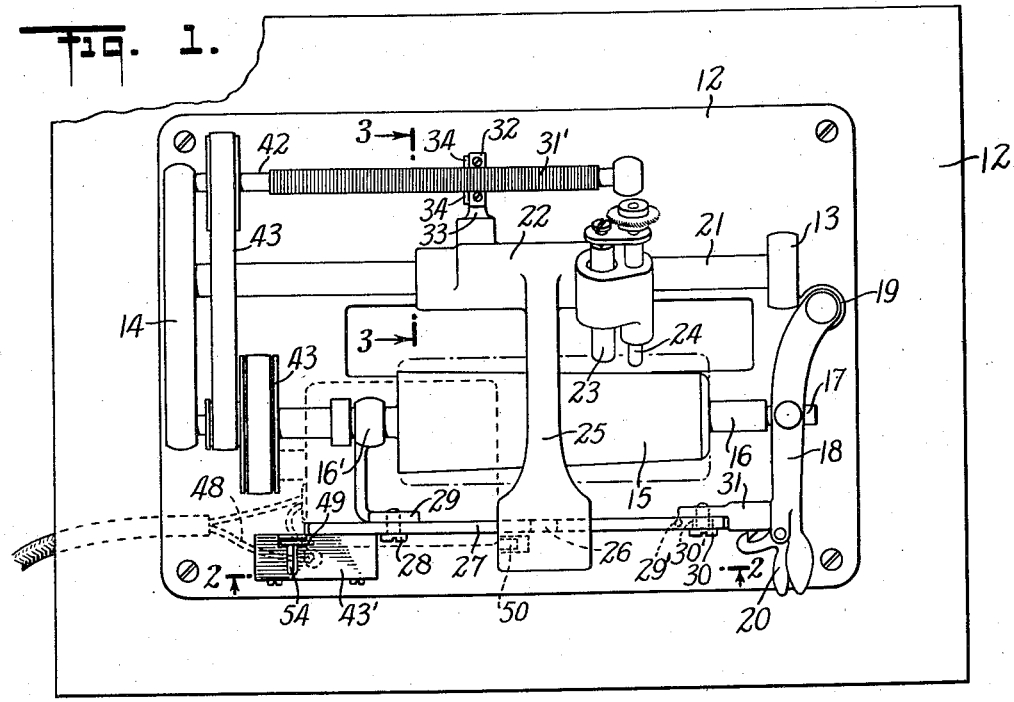
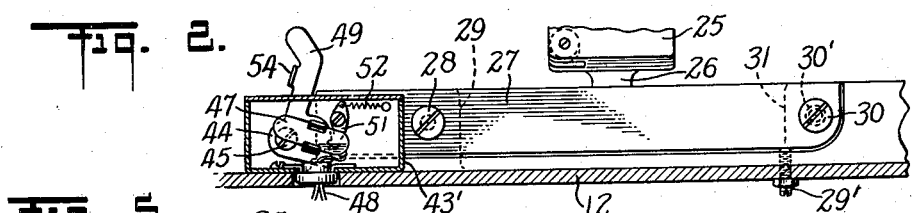
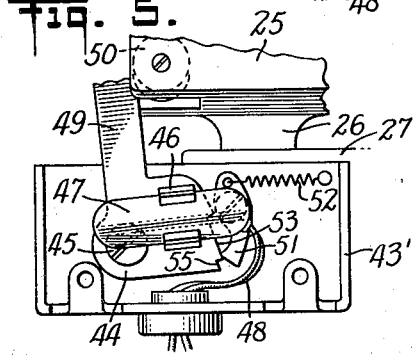
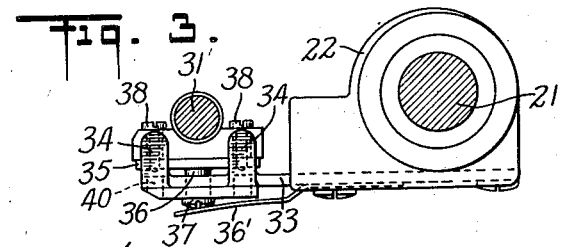
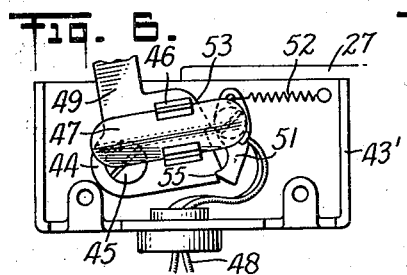
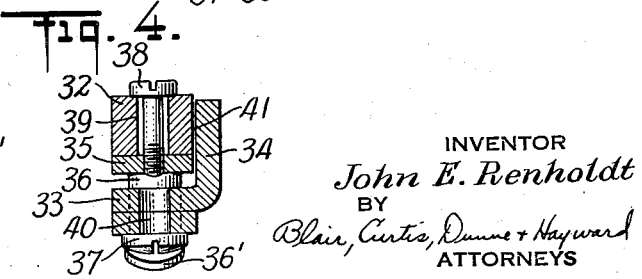
INVENTOR
*John E. Renholdt*
BY
*Blair, Curtis, Dunne & Hayward*
ATTORNEYS Patented Nov. 28, 1939

2,181,643

UNITED STATES PATENT OFFICE 2,181,643

RECORD RESURFACING MACHINE

John E. Renholdt, Bridgeport, Conn., assignor to Dictaphone Corporation, New York, N. Y., a corporation of New York Application November 6, 1937, Serial No. 173,128

8 Claims. (Cl. 82—1.1)

This invention relates to machines for resurfacing record blanks of the type used with dictating machines.

Presently, machines of the type illustrated in the Frykman Patent No. 1,740,425, for instance, include a rotatable record supporting mandrel. A guide rod, whose longitudinal axis is arranged, as accurately as possible, parallel with that of the mandrel, supports a resurfacing tool carriage that is pivotally mounted on the guide rod and is adapted to slide longitudinally therealong. The movement of this carriage and consequently of the resurfacing tool that it carries is caused by the engagement of a feed nut with a feed screw. The axis of this feed screw is arranged, as accurately as possible, parallel with the axes of the mandrel and the guide rod. An extension of the tool carriage engages and slides upon a rail that supports the tool carriage in such position during the resurfacing operation that the resurfacing tool bears the proper relationship to the record blank. The plane of the supporting surface of this rail is, as accurately as possible, parallel with parallel planes in which lie the axes of the mandrel, carriage guide rod and feed screw. The absolute parallelism of these elements will insure an even resurfacing cut of a uniform depth and will insure the proper engagement of the feed nut with the feed screw.

To compensate for a variation in this desirable parallelism, it has been the practice to so mount the feed nut on the tool carriage that it has up and down freedom of movement in relation to the carriage so that the intermeshing of the feed screw and the feed nut will approach the ideal as nearly as possible.

It has been the practice, however, to depend mainly upon the accuracy of the permanent positions of the mandrel, the guide rod and the rail, to accomplish the desired uniformity in the depth of cut of the resurfacing tool.

The above mentioned parallelism of the supporting surface of the guide rail with the appropriate planes of the axes of the mandrel, carriage guide rod and feed screw has in the past been attained with considerable difficulty, so much so, in fact, that in the manufacture of each individual machine, in order to secure satisfactory results, it has been the practice to finish the said supporting surface manually by filing or otherwise after the carriage had been mounted in operative relation to mandrel, guide rod and feed screw.

The present invention seeks to provide a structure in which the ideal parallelism spoken of heretofore is approached as nearly as possible in a simple and efficient manner; and in which any variation from the parallel of the axes of the feed screw and the guide rod or any wear of the feed nut or the feed screw will not affect the perfect intermeshing of the feed nut and the feed screw.

Moreover, the invention contemplates the provision of means for automatically stopping the rotation of the mandrel at the end of the travel of the resurfacing tool when the feed nut and feed screw become mutually inoperative.

In the drawing, which illustrates one embodiment of the invention:

Figure 1 is a plan view of the record resurfacing machine showing the application of the invention thereto;

Figure 2 is a vertical sectional view on line 2—2 of Figure 1, showing the guide rail and control switch;

Figure 3 is a sectional view on line 3—3 of Figure 1 showing the feed nut and associated mechanism in side elevation;

Figure 4 is a sectional view taken at right angles to Figure 3;

Figure 5 is a fragmentary view of the control switch, showing the same in an open position effected by engagement with the carriage; and Figure 6 is a similar view showing the switch in manually effected and automatically maintained open position.

The record resurfacing machine illustrated includes a base 12 which carries a pair of upwardly extending spaced standards 13 and 14. The mandrel 15 is carried by the mandrel shaft 16 which, at one end, is supported by a bearing on the standard 14 and, at the other end, by a removable bearing 17 on the end gate 18. This end gate is, as usual, mounted at one end on a vertical pivot 19 and at the other end is provided with a latch mechanism 20 which, when operative, maintains the bearing 17 and the mandrel shaft 16 in cooperative relationship and which, when inoperative, will permit the end gate 18 to be swung about its pivot to permit the removal of the record from the mandrel.

The auxiliary support 16', through which the mandrel shaft 16 loosely passes, is rigid with the base 12 and is adapted to support the mandrel when the gate 18 has been swung to permit the removal of the record.

The guide rod 21 is mounted between the standards 13 and 14 with its axis parallel with that of the mandrel shaft 16. On this guide rod 21 the resurfacing tool carriage 22 is mounted for both pivotal and sliding movements. This carriage 22 supports the knife bar 23 and the gauge bar 24 with their associated mechanisms which may be of the character disclosed in the above referred to patent and is provided with an extending arm 25 that bridges the mandrel 15 and, at its free end, is provided with a shoe 26. This shoe 26 rests upon and is adapted to slide upon the rail 27.

As has been heretofore stated, the plane of the surface with which the shoe 26 contacts should, in the ideal position, be parallel with parallel planes of the axes of the mandrel shaft 16 and the rod 21. In order that this condition may be quickly and easily attained, the rail 27 is mounted on a pivot 28 that is supported on a bracket 29 which is rigid with the base 12 and with the auxiliary support 16' for the mandrel shaft 16. This rail is free to move about the pivot 28 so that the plane of the shoe supporting surface of the rail 27 may be adjusted in respect of the longitudinal axes of the rod 21 and the mandrel shaft 16. This adjustment is accomplished by means of an adjusting screw 29' that is mounted in the base 12 and may be operated to move the rail 27 upon its pivot 28. When properly adjusted, that is to say, when the plane of the shoe supporting face of the rail is parallel with parallel planes that include the axes of the rod 21 and the mandrel shaft 16, the rail may be locked in position by such means as a lock screw 30 that extends through a hole 30' of larger diameter in the rail and has screw threaded engagement with a projection 31 rigid with the base 12.

By this means the axes of the rod 21 and the mandrel shaft 16 and the line of travel of the shoe 26 may be brought into substantial parallelism. When such parallelism is attained the resurfacing tool 23 will travel across the record blank in such position that a cut or shaving of uniform depth will be produced.

In order that the resurfacing tool may be advanced across the record blank during the resurfacing operation, a feed screw 31', whose longitudinal axis is parallel with the axes of the rod 21 and the mandrel shaft 16, is supported in bearings on the base 12. A feed nut 32 is carried by the tool carriage 22 and is adapted to intermesh with the feed screw 31'.

This feed nut is mounted in the following manner: A bracket 33, that has a pair of upwardly extending abutments 34, is mounted on the tool carriage 22 and extends across under the feed screw 31'.

A feed nut carrier 35 is mounted on the bracket 33 for movement toward and away from the bracket. A lug 36 that is rigid with the nut carrier 35 extends loosely through a hole in the bracket that is larger in diameter than the diameter of the lug. The carrier 35 is normally urged away from the bracket by resilient means such as a leaf spring 36' that is carried by the bracket 33 and that engages a head 37 on the lug 36. This head, contacting with the bracket 33, limits this movement of the nut carrier under the influence of the spring.

The feed nut 32 is adjustably, removably, and rigidly mounted on the feed nut carrier 35. This mounting is accomplished by screws 38 that extend through the holes 39 of larger diameters than the diameters of the screws, and are in screw-threaded engagement with the nut carrier 35. The relative diameters of the holes 39 and the screws 38 permit the adjustment of the nut in any direction in the plane of the supporting bracket. The ends of these screws may extend through and beyond the nut carrier and in this event the bracket is recessed, at 40, to receive these ends. The carrier 35 and the nut 32 are so positioned that, normally, a space 41 exists between adjacent faces of the abutments 34 and of the carrier 35 and the nut 32.

With this construction it will be seen that the nut 32 is free to move about the axis of the lug 36 as a pivot, is free to move to and away from the bracket 33 and is free to rock on the bracket so that when the threads of the feed nut are engaged with the threads of the feed screw, the nut automatically will adjust itself to the screw initially and also during the progressive wearing of either or both. Thus, any inaccuracy in the parallelism between the axis of the feed screw and the axis of the tool carriage rod 21 will be compensated for and no undue wear on either the feed screw or the screw nut will occur.

As has been heretofore stated, the nut 32, at the end of the cutting stroke of the shaving tool, passes beyond the end of the feed screw 31, into a free space 42 in which position it becomes inoperative.

In order that the rotation of the feed screw and mandrel may be automatically arrested when the feed nut arrives in this free position and may be automatically reactuated when the feed nut is removed from such free position, I have provided a switch mechanism such as illustrated in Figures 2, 5 and 6 of the drawing. This switch controls the energizing circuit of an electric motor (not shown) that drives the pulley and belt mechanism 43 that actuates the feed screw and mandrel shaft.

This switch mechanism includes a casing 43' that is secured to the base 12 and is adapted to carry a fluid switch, such for instance as a mercury switch. A lever 44 is mounted within the casing 43' on a pivot 45 and is provided with a clip 46 in which a mercury switch 47 may removably be mounted so that when the lever moves in one direction on its pivot the mercury will flow to one end of the capsule and complete the circuit between the ends of the wire 48 in which the driving motor is interpolated, and when moved in the opposite direction, the mercury will flow to the opposite end of the capsule, away from the ends of the wire 48, and break the circuit. The arm 49 of the lever extends into the path of travel of the extension 25 of the tool carriage 22, and is arranged to be engaged by a cam roller 50 on the extension so that the carriage, as it approaches the end of its cutting stroke, will move the lever 44 about its pivot to break the motor circuit. When the carriage moves in the opposite direction and this engagement is destroyed, the lever is returned to its initial position, where the motor circuit will again be established, by a cam 51, that is actuated by a spring 52, and cooperates with a cam face 53 on the lever to move the lever about its pivot.

In order that the switch 47 may be manually operated, I have provided an extension 54 on the arm 49 of the lever 44, which is located for convenient manual engagement. Moreover, by means of this extension 54, the lever may be moved about its pivot until the cam 51 engages a notch 55 in the lever 44, at which time the cam will act, in conjunction with said notch, as a locking cam and maintain the lever in such position that the mercury of the switch will be out of contact with the ends of the wire of the motor circuit. The arrangement of this cam and notch is such that when pressure is applied to the extension 54 in the opposite direction the cam and notch will be disengaged against the action of the spring 52 and the cam 51 will then cooperate with the cam surface 53 to return the switch to its circuit closing position.

Thus it will be seen that I have provided a construction wherein a uniform depth of cut will be produced by the travel of the resurfacing tool across the face of the record blank and wherein the feed nut and the feed screw for the tool carriage automatically will maintain a proper engagement during the operation of the machine, regardless of the fact that the two are disengaged during the travel of the tool carriage to its starting position. Moreover, I have provided a control switch, which, cooperating with the elements that I have described, makes it possible automatically or manually to control the operation of the resurfacing tool and its feed screw.

What I claim is:

1. In a record resurfacing machine, a tool carriage, a rod for slidably supporting the tool carriage, a feed screw, a bracket carried by the tool carriage, a feed nut mounted on the bracket and adapted to interengage with the feed screw and capable of free pivotal and rocking motions on said bracket.

2. In a record resurfacing machine, a tool carriage, a rod for slidably supporting the tool carriage, a feed screw, a bracket carried by the tool carriage, a feed nut mounted on the bracket, a lug rigid with the feed nut and extending through a hole in the bracket of larger diameter than that of the lug, and resilient means for forcing the feed nut into accurate engagement with the feed screw.

3. In a record resurfacing machine, a tool carriage, a rod for slidably supporting the tool carriage, a feed screw, a bracket carried by the tool carriage, a feed nut mounted on the bracket and adapted to interengage with the feed screw and capable of free pivotal and rocking motions on said bracket, and resilient means for forcing the feed nut into accurate engagement with the feed screw.

4. In a record resurfacing machine, a tool carriage, a rod for slidably supporting the tool carriage, a feed screw having an inactive area, a feed nut carried by the tool carriage and adapted to interengage with the feed screw and to pass into the inactive area thereof, a motor for actuating the feed screw, and means automatically operable by the tool carriage to de-energize the motor when the feed nut passes into the inactive area of the feed screw.

5. In a record resurfacing machine, a tool carriage, a rod for slidably supporting the tool carriage, a feed screw having an inactive area, a feed nut carried by the tool carriage and adapted to interengage with the feed screw and to pass into the inactive area thereof, a motor for actuating the feed screw, and means automatically operable by the tool carriage to de-energize the motor when the feed nut passes into the inactive area of the feed screw, said means including a fluid switch interpolated in the motor circuit.

6. In a record resurfacing machine, a tool carriage, a rod for slidably supporting the tool carriage, a feed screw having an inactive area, a feed nut carried by the tool carriage and adapted to interengage with the feed screw and to pass into the inactive area thereof, a motor for actuating the feed screw, and means automatically operable by the tool carriage to de-energize the motor when the feed nut passes into the inactive area of the feed screw, said means including a fluid switch interpolated in the motor circuit and manually operable means for maintaining said switch in its open position.

7. In a record resurfacing machine, a tool carriage, a rod for slidably supporting the tool carriage, a feed screw having an inactive area, a feed nut carried by the tool carriage and adapted to interengage with the feed screw and to pass into the inactive area thereof, a motor for actuating the feed screw, and means automatically operable by the tool carriage to de-energize the motor when the feed nut passes into the inactive area of the feed screw, and automatically operable means for rendering the motor de-energizing means inoperative.

8. In a record resurfacing machine, a tool carriage, a rod for slidably supporting the tool carriage, a feed screw, a feed nut carried by the tool carriage and adapted to engage with the feed screw, a motor for actuating the feed screw, and means automatically operable by the tool carriage to de-energize the motor comprising a switch in the motor circuit, spring actuated means normally operable to move said switch to its closed position, and means adapted to cooperate with said spring actuated means and operable independently of said tool carriage to hold said switch in its open position.

JOHN E. RENHOLDT.